United States Patent
Nazarpoor

(10) Patent No.: US 8,969,228 B2
(45) Date of Patent: Mar. 3, 2015

(54) PROCESS FOR ELIMINATION OF HEXAVALENT CHROMIUM COMPOUNDS ON METALLIC SUBSTRATES WITHIN ZERO-PGM CATALYST SYSTEMS

(71) Applicant: Zahra Nazarpoor, Camarillo, CA (US)

(72) Inventor: Zahra Nazarpoor, Camarillo, CA (US)

(73) Assignee: Clean Diesel Technologies, Inc., Oxnard, CA (US)

( * ) Notice: Subject to any disclaimer, the term of this patent is extended or adjusted under 35 U.S.C. 154(b) by 0 days.

(21) Appl. No.: 13/940,990

(22) Filed: Jul. 12, 2013

(65) Prior Publication Data

US 2015/0017082 A1 Jan. 15, 2015

(51) Int. Cl.
- *B01J 33/00* (2006.01)
- *B01D 53/58* (2006.01)
- *B01D 53/46* (2006.01)
- *B01D 53/62* (2006.01)

(52) U.S. Cl.
CPC .............. *B01D 53/58* (2013.01); *B01D 53/46* (2013.01); *B01D 53/62* (2013.01); *Y10S 502/50* (2013.01); *Y10S 502/514* (2013.01); *Y10S 502/52* (2013.01); *Y10S 502/521* (2013.01); *Y10S 502/52712* (2013.01)
USPC .................. 502/1; 502/2; 502/304; 502/344; 502/345; 502/439; 502/500; 502/514; 502/520; 502/521; 502/527.12

(58) Field of Classification Search
CPC ............ B01J 33/00; B01J 37/00; B01J 37/14; B01J 23/72; B01J 23/50; B01J 23/10
USPC ......... 502/1, 2, 304, 344, 345, 439, 500, 514, 502/520, 521, 527.12
See application file for complete search history.

(56) References Cited

U.S. PATENT DOCUMENTS

| | | | | |
|---|---|---|---|---|
| 4,331,631 A | * | 5/1982 | Chapman et al. | 422/180 |
| 4,414,023 A | * | 11/1983 | Aggen et al. | 420/40 |
| 4,797,329 A | * | 1/1989 | Kilbane et al. | 428/623 |
| 4,885,269 A | * | 12/1989 | Cyron | 502/439 |
| 7,129,194 B2 | * | 10/2006 | Baca et al. | 502/300 |
| 2009/0324468 A1 | * | 12/2009 | Golden et al. | 423/210 |
| 2010/0184590 A1 | * | 7/2010 | Althofer et al. | 502/185 |
| 2010/0240525 A1 | * | 9/2010 | Golden et al. | 502/65 |

FOREIGN PATENT DOCUMENTS

| | | | | |
|---|---|---|---|---|
| CH | 644637 A5 | * | 8/1984 | B01J 33/00 |
| JP | 4-215853 A | * | 8/1992 | B01J 35/02 |

* cited by examiner

*Primary Examiner* — Timothy Vanoy
(74) *Attorney, Agent, or Firm* — Barnes & Thornburg LLP; Thomas J. McWilliams; Edward F. Behm, Jr.

(57) ABSTRACT

Systems and Methods for manufacturing ZPGM catalysts systems that may allow the prevention of formation or the conversion of corrosion causing compounds, such as hexavalent chromium compounds, within ZPGM catalyst systems are disclosed. ZPGM catalysts systems, may include metallic substrate, which may include alloys of iron and chromium, a washcoat and an overcoat. Disclosed manufacturing processes may include a thermal decomposition of hexavalent chromium compounds which may allow the decomposition of such compounds into trivalent chromium compounds, and may also produce metallic catalyst, such as silver.

17 Claims, 4 Drawing Sheets

PROCESS FOR ELIMINATION OF HEXAVALENT CHROMIUM COMPOUNDS ON METALLIC SUBSTRATES WITHIN ZERO-PGM CATALYST SYSTEMS

CROSS-REFERENCE TO RELATED APPLICATIONS

N/A

BACKGROUND

1. Technical Field

The present disclosure relates generally to ZPGM catalyst systems, and, more particularly, to elimination of corrosion causing compounds on ZPGM catalyst systems.

2. Background Information

Ceramic substrates may dominate the car market, primarily because they are mass-produced and therefore less costly. However, metallic substrates may offer the industry of catalyst systems significant advantages.

The substrate of a catalytic system may fulfill an important role in supporting the catalytic material and may be capable of withstanding some extremely arduous conditions. Operating temperatures may be in excess of 1000° C. and the substrate may also be exposed to fast moving, corrosive exhaust gases, rapid changes in temperature and pressure, and external factors such as shocks and vibration.

A major problem with manufacturing of catalyst systems may be the presence of corrosion in the catalyst systems. Formulations of catalysts systems may include at least a substrate, a washcoat and an overcoat. There may be many alloys employed as substrates for catalyst systems, which may include corrosive metals such as iron, and chromium, among others. Additionally, washcoat and overcoat, within catalyst systems, may include elements that may also contribute in the formation of corrosion.

For the aforementioned reasons, there is a need for a process for manufacturing catalysts systems that may allow the prevention of formation or the conversion of materials, such as hexavalent chromate compounds, within substrates, washcoats or overcoats of catalyst systems that may contribute in the formation of corrosion, therefore allowing a better performance of the catalyst systems.

SUMMARY

The present disclosure may provide a process that may be enabled to prevent formation of hexavalent chromium compounds which may cause corrosion in zero platinum group metal (ZPGM) catalyst systems.

According to embodiments in present disclosure, compositions of ZPGM catalyst systems may include any suitable combination of a metallic substrate, a washcoat, and an overcoat. Washcoat, and/or an overcoat may include ZPGM metal catalyst such as copper (Cu), cerium (Ce), silver (Ag), and other metal combinations. Catalyst samples with metallic substrate of varied geometry and cells per square inch (CPSI) may be prepared using any suitable synthesis method as known in current art.

In one embodiment, disclosed ZPGM catalysts systems, may include metallic substrate, which may include alloys of iron and chromium, a washcoat and an overcoat.

Disclosed ZPGM catalyst system may be manufactured by employing known in the art co-milling procedures for WC preparation and known in the art co-precipitation procedures for OC preparation. Suitable deposition methods may be employed in order to deposit WC on metallic substrate as well as OC on WC material. Subsequently, known in the art drying and firing treatments may be applied. Aging treatments may also be applied on disclosed ZPGM catalyst systems, at the beginning of aging treatment as the temperature of ZPGM catalyst system reaches about 600° C., formation hexavalent chromium ($Cr^{6+}$) in the form of chromic acid vapor from metallic substrate may take place. Chromic acid vapor is a toxic compound, and thus undesirable. Then, as aging treatment reaches about 650° C. to 700° C., reaction between chromic acid and metallic zero-PGM metal, such as Ag, may take place and $Cr^{6+}$, in the form of silver chromate, may be formed. Silver chromate is pinkish-red, thus a pinkish red corrosion may be observed on the surface of substrate edge.

Disclosed manufacturing process may include a thermal decomposition of hexavalent chromium compounds which may allow the decomposition of such compounds into trivalent chromium compounds, and may also produce metallic catalyst, such as silver. Such conversion may prevent corrosion formation, such as red color corrosion within ZPGM catalyst system. Thermal decomposition process may include aging ZPGM catalyst system at about 1100° C., in the presence of air and under dry conditions. The duration may take place from 3 hours to 6 hours.

An embodiment of the disclosed process may include a reducing agent, such as hydrogen ($H_2$), carbon monoxide (CO), or ammonia ($NH_3$), among others, that may be present in exhaust conditions, at temperatures of about 400° C. or higher, which may allow the conversion of hexavalent chromium compounds, in the form of silver chromate into trivalent chromium compounds in the form of chromate oxide. When such conversion takes place, a metallic catalyst, such as silver, may also be produced.

Employing the disclosed manufacturing process may allow the production of ZPGM catalyst systems without corrosion causing hexavalent chromium compound, therefore ZPGM catalyst systems exhibiting high activity and enhanced performance may be produced.

The disclosed manufacturing process may allow production of ZPGM catalyst system without corrosion which may cause hexavalent chromium compound. The disclosed manufacturing process may also provide ZPGM catalyst systems which may exhibit high activity and enhanced performance.

Numerous other aspects, features, and advantages of the present disclosure may be made apparent from the following detailed description.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DETAILED DESCRIPTION

Figure 1:
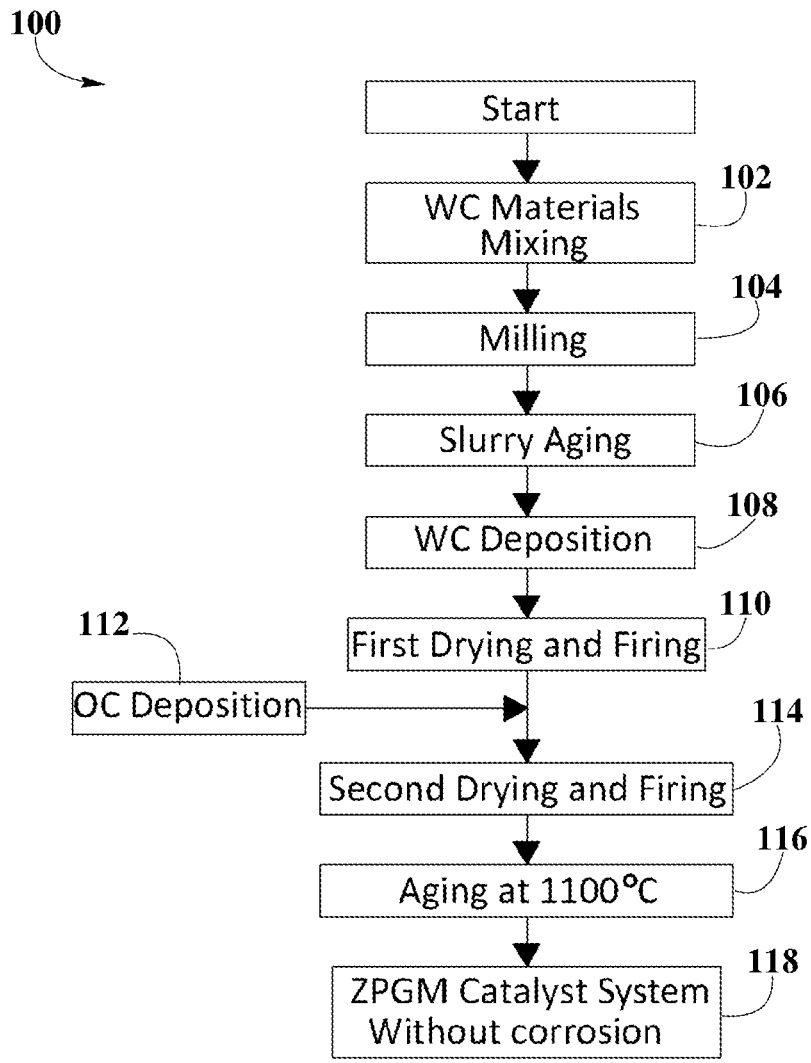
FIG. 1 is a flowchart of manufacturing process for ZPGM catalyst systems, according to an embodiment.

In the following detailed description, reference is made to the accompanying drawings, which form a part hereof. In the drawings, which are not to scale or to proportion, similar symbols typically identify similar components, unless context dictates otherwise. The illustrative embodiments described in the detailed description, drawings and claims, are not meant to be limiting. Other embodiments may be used and/or and other changes may be made without departing from the spirit or scope of the present disclosure.

DEFINITIONS

As used here, the following terms may have the following definitions:

"Catalyst system" may refer to a system of at least two layers including at least one substrate, a washcoat, and/or an overcoat.

"Substrate" may refer to any material of any shape or configuration that yields a sufficient surface area for depositing a washcoat and/or overcoat.

"Washcoat (WC)" may refer to at least one coating including at least one oxide solid that may be deposited on a substrate.

"Overcoat (OC)" may refer to at least one coating that may be deposited on at least one washcoat layer.

"Catalyst" may refer to one or more materials that may be of use in the conversion of one or more other materials.

"Zero platinum group (ZPGM) catalyst" may refer to a catalyst completely or substantially free of platinum group metals.

"Platinum group metals" may refer to, platinum, palladium, ruthenium, iridium, osmium, and rhodium.

"Carrier material oxide (CMO)" may refer to materials used for providing a surface for at least one catalyst.

"Oxygen storage material (OSM)" may refer to a material able to take up oxygen from oxygen rich streams and able to release oxygen to oxygen deficient streams.

"Treating," "treated," or "treatment" may refer to drying, firing, heating, evaporating, calcining, or mixtures thereof.

"Edge" may refer to the connection of substrate lip and substrate matrix within catalyst systems.

"Co-precipitation" may refer to the carrying down by a precipitate of substances normally soluble under the conditions employed.

"Milling" may refer to the operation of breaking a solid material into a desired grain or particle size.

"Calcination" may refer to a thermal treatment process applied to solid materials, in presence of air, to bring about a thermal decomposition, phase transition, or removal of a volatile fraction at temperatures below the melting point of the solid materials.

"Conversion" may refer to the chemical alteration of at least one material into one or more other materials.

DESCRIPTION OF THE DRAWINGS

Various example embodiments of the present disclosure are described more fully with reference to the accompanying drawings in which some example embodiments of the present disclosure are shown. Illustrative embodiments of the present disclosure are disclosed here. However, specific structural and functional details disclosed here are merely representative for purposes of describing example embodiments of the present disclosure. This disclosure however, may be embodied in many alternate forms and should not be construed as limited to only the embodiments set forth in the present disclosure.

Process for manufacturing zero platinum group metal (ZPGM) catalyst systems that may allow the prevention of formation or the conversion of materials, such as hexavalent chromate compounds, within metallic substrate, washcoat (WC) or overcoat (OC) of catalyst systems that may contribute in the formation of corrosion, is disclosed.

ZPGM Catalyst System Configuration and Composition

Disclosed ZPGM catalyst systems may include a metallic substrate, a WC, and an OC.

Metallic Substrates

Metallic substrates may be in the form of beads or pellets or of any suitable form. The beads or pellets may be formed from any suitable material such as alumina, silica alumina, silica, titania, mixtures thereof, or any suitable material. If substrate is a metal honeycomb, the metal may be a heat-resistant base metal alloy, particularly an alloy in which iron is a substantial or major component. The surface of the metal substrate may be oxidized at temperatures higher than 1000° C. to improve the corrosion resistance of the alloy by forming an oxide layer on the surface of the alloy.

Metallic substrate may be a monolithic carrier having a plurality of fine, parallel flow passages extending through the monolith. The passages may be of any suitable cross-sectional shape and/or size. The passages may be trapezoidal, rectangular, square, sinusoidal, hexagonal, oval, or circular, although other shapes may be suitable. The monolith may contain from about 9 to about 1,200 or more gas inlet openings or passages per square inch of cross section, although fewer passages may be used. Metallic substrate may be used with different dimension and cell density (CPSI).

WC Material Composition

According to an embodiment of the present disclosure, washcoat composition may include at least one ZPGM transition metal catalyst and a carrier material oxide. ZPGM transition metal catalyst may include scandium, manganese, iron, cobalt, nickel, copper, zinc, yttrium, niobium, molybdenum, silver, cadmium, tantalum, tungsten, and gallium. Most suitable ZPGM transition metal may be silver. The total amount of silver may be of about 1% w/w to about 20% w/w of the total catalyst weight; most suitable amount may be of about 5% w/w to 8% w/w. Carrier material oxide, within washcoat, may include alumina ($Al_2O_3$) or lanthanum doped alumina.

OC Material Composition

Overcoat composition may include at least one ZPGM transition metal such as copper oxide, ceria, at least one carrier material oxides, and at least one oxygen storage material (OSM), which may be a mixture of cerium (Ce), zirconium (Zr), neodymium (Nd), and praseodymium (Pr). The copper (Cu) and Ce in overcoat may be present in about 5% w/w to about 50% w/w or from about 10% w/w to about 16% w/w of Cu; and about 12% w/w to about 20% w/w of Ce. Carrier material oxides, within overcoat, may include aluminum oxide, doped aluminum oxide, spinel, delafossite, lyonsite, garnet, perovksite, pyrochlore, doped ceria, fluorite, zirconium oxide, doped zirconia, titanium oxide, tin oxide, silicon dioxide, zeolite, and mixtures thereof. Suitable carrier material oxide for the disclosed overcoat may include one or more selected from the group consisting of aluminum oxide ($Al_2O_3$) or doped aluminum oxide. The doped aluminum oxide in overcoat may include one or more selected from the group consisting of lanthanum, yttrium, lanthanides and mixtures thereof. The amount of doped lanthanum in alumina may vary from 0% w/w (i.e., pure aluminum oxide) to 10% w/w of lanthanum oxide. Other embodiments may include pure alumina ($Al_2O_3$) as Carrier material oxides. Carrier material oxides and OSM included in overcoat may be present in a ratio of about 60% w/w to about 40% w/w.

Manufacturing Process for ZPGM Catalyst Systems

A ZPGM catalyst system including a metallic substrate, a WC and an OC may be prepared.

FIG. 1 is a flowchart of manufacturing process 100 for ZPGM catalyst systems in the present disclosure which may include an aging process at about 1100° C. for producing a ZPGM catalyst system.

In order to start production of disclosed ZPGM catalyst system, WC may be prepared. Preparation of WC may be achieved at room temperature. WC may be prepared by milling powder forms including WC materials in any suitable mill, such as vertical or horizontal mills. WC materials may undergo a mixing step 102 with water or any suitable organic solvent. Suitable organic solvents may include ethanol, and diethyl ether, carbon tetrachloride, and trichloroethylene, among others. Powder WC materials may include ZPGM transition metal catalyst precursors, such as silver nitrate; and Carrier material oxide (CMOs), such as alumina based binder, as previously described.

Subsequently, mixed WC materials may undergo a milling step 104 in order to be milled into smaller particle sizes during a period of time from about 10 minutes to about 10 hours, depending on the batch size, kind of material, and particle size desired. According to embodiments in the present disclosure WC particle size of the WC slurry may be of about 4 μm to about 10 μm in order to get uniform distribution of WC particles. The pH of WC slurry may be adjusted to a desired value by adjusting the rheology of the aqueous WC slurry adding acid or base solutions or various salts or organic compounds, such as, acetic acid, among others. WC slurry may have a pH of about 4 to about 5. After milling step 104, WC slurry may undergo a slurry aging 106 step at room temperature for a period of time of about 24 hours under room conditions and continued stirring.

Then in WC deposition step 108, WC, in the form of aqueous slurry, may be deposited on a suitable metallic substrate employing vacuum dosing and coating systems and may be subsequently treated. A plurality of deposition methods may be employed, such as placing, adhering, curing, coating, spraying, dipping, painting, or any known process for coating a film on at least one metallic substrate. If the metallic substrate is a monolithic carrier with parallel flow passages, WC may be formed on the walls of the passages. Various capacities of WC loadings in the present disclosure may be coated on the metallic substrate. The WC loading may vary from 60 g/L to 200 g/L.

After WC has been deposited on the metallic substrate, according to embodiments in the present disclosure WC may undergo a first drying and firing step 110. For drying the WC, air knife drying systems may be employed. Firing (heat treatment) may be performed using commercially-available firing (calcination) systems. Calcination may take from about 2 hours to about 6 hours, preferably about 4 hours, and at a temperature of about 300° C. to about 600° C., preferably about 550° C. After WC is treated and cooled at room temperature, OC deposition 112 may take place, where OC may be deposited on WC.

The OC may be prepared by co-precipitation synthesis method. Preparation may begin by mixing the appropriate amount of Cu and Ce salts, such as nitrate, acetate or chloride solutions, where the suitable Cu loadings may include loadings in a range as previously described. Subsequently, the Cu—Ce solution may be mixed with the slurry of CMO support. Co-precipitation of the OC may include the addition of appropriate amount of one or more of NaOH solution, $Na_2CO_3$ solution, and ammonium hydroxide ($NH_4OH$) solution. The pH of OC slurry may be adjusted within range of 5.0 to 6.0 by adjusting the rheology of the aqueous OC slurry adding acid or base solutions or various salts or organic compounds, such as, ammonium hydroxide, aluminum hydroxide, acetic acid, citric acid, tetraethyl ammonium hydroxide, other tetralkyl ammonium salts, ammonium acetate, ammonium citrate, glycerol, commercial polymers such as polyethylene glycol, polyvinyl alcohol, and other suitable compounds. The OC slurry may be aged for a period of time of about 12 to 24 hours under continues stirring at room temperature. Precipitation may be formed over slurry including at least one suitable CMO, or any number of additional suitable CMOs, and may include one or more suitable OSMs as previously described.

After precipitation, in OC deposition 112 step, OC slurry may be deposited on WC by employing suitable deposition techniques such as vacuum dosing, among others. The OC loading may vary from 60 g/L to 200 g/L. OC may then undergo a second drying and firing step 114 employing suitable heat treatment techniques employing firing (calcination) systems or any other suitable treatment techniques. OC, WC, and metallic substrate may be treated for about 2 hours to about 6 hours, preferably about 4 hours, at a temperature of about 300° C. to about 600° C., preferably about 550° C., in the presence of air.

Following second drying and firing step 114, an aging at 1100° C. 116 step, in the presence of air, for about 4 hours, may be applied and ZPGM catalyst system without corrosion 118 may be obtained. No red color on the surface of substrate edge within ZPGM catalyst system without corrosion 118 may be observed; therefore no hexavalent chromium compounds is included in the ZPGM catalyst system without corrosion 118.

In another embodiment, a ZPGM catalyst system without corrosion 118, may also be manufactured employing a reducing agent that may convert hexavalent chromium compounds to trivalent chromium compounds, therefore preventing corrosion formation on disclosed ZPGM catalyst systems.

Figure 2:
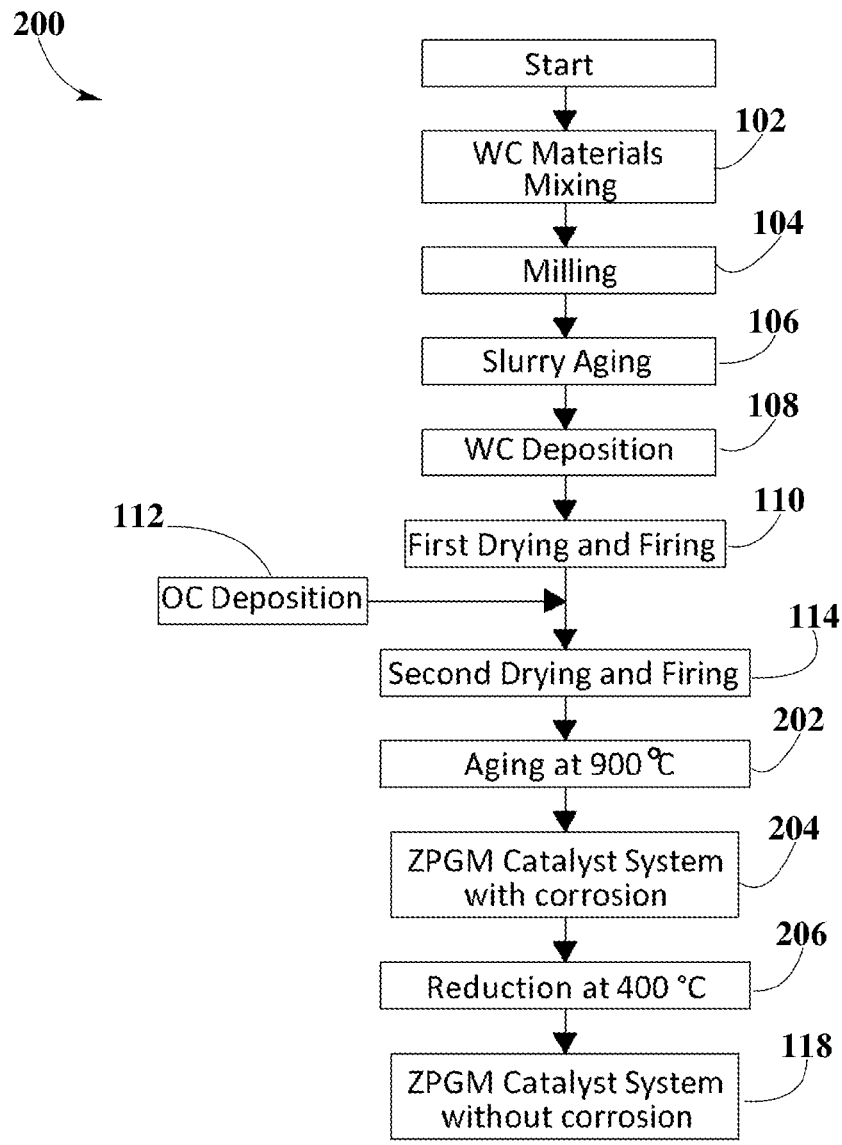
FIG. 2 is a flowchart of second manufacturing process for ZPGM catalyst systems, according to an embodiment.

FIG. 2 is a flowchart of second manufacturing process 200 for ZPGM catalyst systems in the present disclosure where a reducing agent may be included for producing ZPGM catalyst system without corrosion 118.

In order to start production of disclosed ZPGM catalyst system, WC may be prepared. Preparation of WC may be achieved at room temperature. WC may be prepared by milling powder forms including WC materials in any suitable mill, such as vertical or horizontal mills. WC materials may undergo a mixing step 102 with water or any suitable organic solvent. Suitable organic solvents may include ethanol, and diethyl ether, carbon tetrachloride, and trichloroethylene, among others. Powder WC materials may include ZPGM transition metal catalyst precursors, such as silver nitrate; and Carrier material oxide (CMOs), such as alumina based binder, as previously described.

Subsequently, mixed WC materials may undergo a milling step 104 in order to be milled into smaller particle sizes during a period of time from about 10 minutes to about 10 hours, depending on the batch size, kind of material, and particle size desired. According to embodiments in the present disclosure WC particle size of the WC slurry may be of about 4 μm to about 10 μm in order to get uniform distribution of WC particles. The pH of WC slurry may be adjusted to a desired value by adjusting the rheology of the aqueous WC slurry adding acid or base solutions or various salts or organic compounds, such as, acetic acid, among others. WC slurry may have a pH of about 4 to about 5. After milling step 104, WC slurry may undergo a slurry aging 106 step at room temperature for a period of time of about 24 hours under room conditions and continued stirring.

Then in WC deposition step 108, WC, in the form of aqueous slurry, may be deposited on a suitable metallic substrate employing vacuum dosing and coating systems and may be subsequently treated. A plurality of deposition methods may be employed, such as placing, adhering, curing, coating, spraying, dipping, painting, or any known process for coating a film on at least one metallic substrate. If the metallic substrate is a monolithic carrier with parallel flow passages, WC may be formed on the walls of the passages. Various capacities of WC loadings in the present disclosure may be coated on the metallic substrate. The WC loading may vary from 60 g/L to 200 g/L.

After WC has been deposited on the metallic substrate, according to embodiments in the present disclosure WC may undergo a first drying and firing step 110. For drying the WC, air knife drying systems may be employed. Firing (heat treatment) may be performed using commercially-available firing (calcination) systems. Calcination may take from about 2 hours to about 6 hours, preferably about 4 hours, and at a temperature of about 300° C. to about 600° C., preferably about 550° C. After WC is treated and cooled at room temperature, OC deposition 112 may take place, where OC may be deposited on WC.

The OC may be prepared by co-precipitation synthesis method. Preparation may begin by mixing the appropriate amount of Cu and Ce salts, such as nitrate, acetate or chloride solutions, where the suitable Cu loadings may include loadings in a range as previously described. Subsequently, the Cu—Ce solution may be mixed with the slurry of CMO support. Co-precipitation of the OC may include the addition of appropriate amount of one or more of NaOH solution, $Na_2CO_3$ solution, and ammonium hydroxide ($NH_4OH$) solution. The pH of OC slurry may be adjusted within range of 5.0 to 6.0 by adjusting the rheology of the aqueous OC slurry adding acid or base solutions or various salts or organic compounds, such as, ammonium hydroxide, aluminum hydroxide, acetic acid, citric acid, tetraethyl ammonium hydroxide, other tetralkyl ammonium salts, ammonium acetate, ammonium citrate, glycerol, commercial polymers such as polyethylene glycol, polyvinyl alcohol, and other suitable compounds. The OC slurry may be aged for a period of time of about 12 to 24 hours under continues stirring at room temperature. Precipitation may be formed over slurry including at least one suitable CMO, or any number of additional suitable CMOs, and may include one or more suitable OSMs as previously described.

After precipitation, in OC deposition 112 step, OC slurry may be deposited on WC by employing suitable deposition techniques such as vacuum dosing, among others. The OC loading may vary from 60 g/L to 200 g/L. OC may then undergo a second drying and firing step 114 employing suitable heat treatment techniques employing firing (calcination) systems or any other suitable treatment techniques. OC, WC, and metallic substrate may be treated for about 2 hours to about 6 hours, preferably about 4 hours, at a temperature of about 300° C. to about 600° C., preferably about 550° C., in the presence of air.

Following second drying and firing step 114, an aging at 900° C. 202 process, in the presence of air, may be applied and ZPGM catalyst system with corrosion 204 may be obtained. A red color on the surface of substrate edge within ZPGM catalyst system with corrosion 204 may be observed; therefore, hexavalent chromium compounds may be included in ZPGM catalyst system without corrosion 118.

In order to prevent or eliminate corrosion material that includes hexavalent chromium compounds, a reducing agent that may be present in exhaust conditions, may be included in the manufacturing process, therefore hexavalent chromium compounds may react with reducing agent forming trivalent chromium compounds and metallic catalyst, such as silver. Reducing agent may include hydrogen ($H_2$), carbon monoxide (CO), and ammonia ($NH_3$), among others. After ZPGM catalyst system with corrosion 204 exposes to reduction at 400° C. 206 with a reducing agent, ZPGM catalyst system with corrosion 204 may turn to a blue-green color showing that, hexavalent chromium compound may not be included in ZPGM catalyst system without corrosion 118 formed.

Therefore, disclosed ZPGM catalyst system with corrosion 204, aged at 900° C. that includes hexavalent chromium compounds may no longer include hexavalent chromium compounds after treating under reducing condition.

Process Reaction Summary

Figure 3:
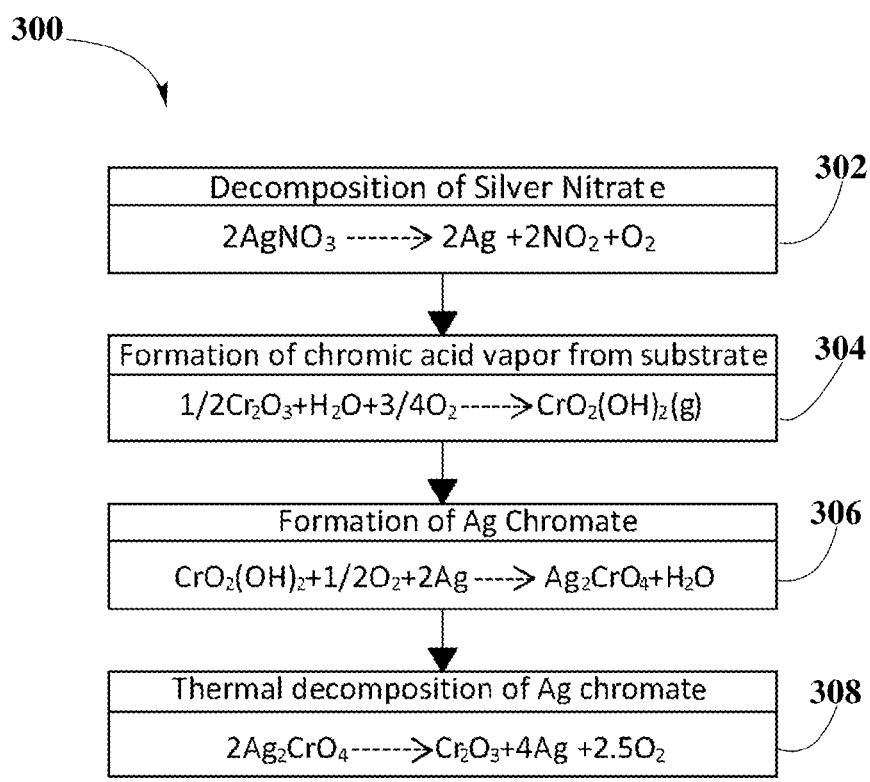
FIG. 3 depicts summary of reactions that may take place during manufacturing process for ZPGM catalyst systems, according to an embodiment.

FIG. 3 depicts summary of reactions 300 that may take place during manufacturing process 100 for ZPGM catalyst systems. During first drying and firing step 110, at about 500° C., decomposition of silver nitrate 302 to metallic silver may take place, obtaining ZPGM catalyst in WC. After first drying and firing step 110, no red color on the surface of substrate edge within ZPGM catalyst system without corrosion 118 may be observed, showing no hexavalent chromium compound is formed. At the beginning of aging at 1100° C. 116 step, as ZPGM catalyst system without corrosion 118 reaches about 600° C., formation hexavalent chromium ($Cr^{6+}$) in the form of chromic acid vapor 304 may take place. Chromic acid vapor 304 is a toxic compound. Chromic acid vapor 304 may be formed because chromium may be released from substrate alloy (Fe—Cr). Then, as aging at 1100° C. 116 step reaches about 650° C. to 700° C., reaction between chromic acid and metallic silver may take place and $Cr^{6+}$, in the form of silver chromate 306, may be formed. Silver chromate 306 is pinkish-red, thus a pinkish red corrosion may be observed on the surface of substrate edge. During aging at 1100° C. 116 step, when temperature reaches about 1000° C., thermal decomposition of silver chromate 308, may take place, therefore $Cr^{6+}$ may be converted into trivalent chromium ($Cr^{3+}$), in the form of chromium oxide and metallic silver may also be obtained. After aging at 1100° C. 116 step, no red color on the surface of substrate edge within ZPGM catalyst system without corrosion 118 may be observed, because there is no presence of $Cr^{6+}$. Therefore, manufacturing process 100 may allow the manufacturing of ZPGM catalyst system without corrosion 118, in which hexavalent chromium compounds corrosion causing may be converted into trivalent chromium compounds, which is not toxic.

Figure 4:
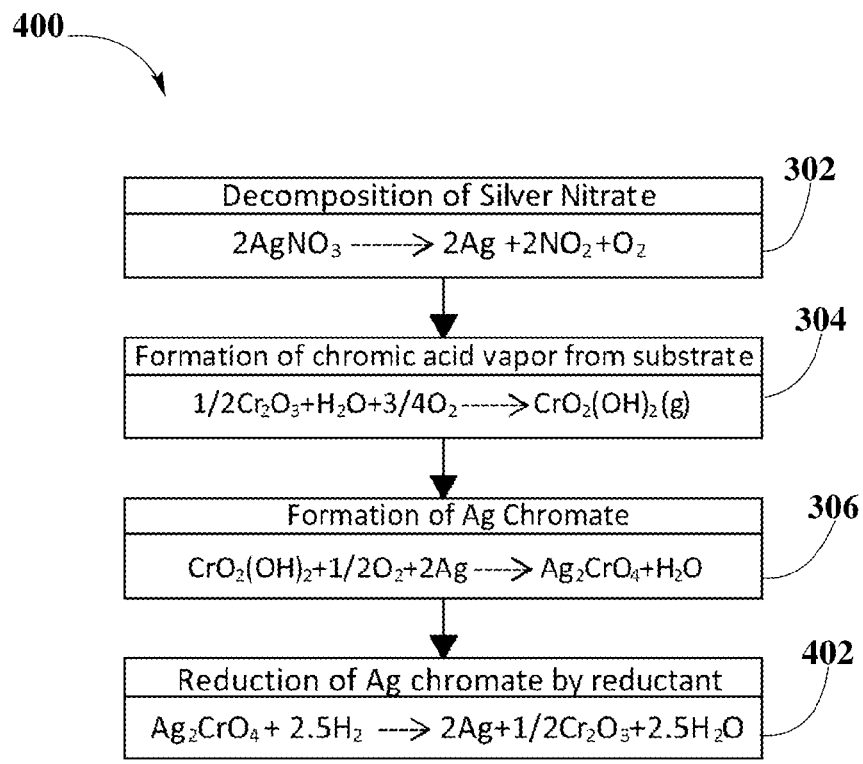
FIG. 4 depicts summary of reactions that may take place during second manufacturing process for ZPGM catalyst systems, according to an embodiment.

FIG. 4 depicts summary of reactions 400 that may take place during second manufacturing process 200 for ZPGM catalyst systems. During first drying and firing step 110, at about 500° C., decomposition of silver nitrate 302 to metallic silver may take place, obtaining ZPGM catalyst in WC. After first drying and firing step 110, no red color on the surface of substrate edge within ZPGM catalyst system without corrosion 118 may be observed, showing no hexavalent chromium is formed. At the beginning of aging at 900° C. 202 process, as ZPGM catalyst system without corrosion 118 reaches about 600° C., formation hexavalent chromium ($Cr^{6+}$) in the form of chromic acid vapor 304 may take place. Chromic acid vapor 304 is a toxic compound. Chromic acid vapor 304 may be formed because chromium may be release from substrate alloy (Fe—Cr). As aging at 900° C. 202 process reaches about 650° C. to 700° C., reaction between chromic acid and metallic silver may take place and $Cr^{6+}$, in the form of silver chromate 306, may be formed. Silver chromate 306 is pinkish-red, thus a pinkish red corrosion may be observed on the surface of substrate edge. During aging at 900° C. 202 process, when temperature reaches about 900° C. a red color on the surface of substrate edge within ZPGM catalyst system with corrosion 204 may be observed, showing the presence of $Cr^{6+}$. Then, when ZPGM catalyst system with corrosion 204 exposes to reduction at 400° C. 206 with a reducing agent such as $H_2$ (at temperatures of about 400° C. or higher), reduction of silver chromate 402 may take place. In reduction of silver chromate 402, silver chromate 306 may react with a reducing agent, such as $H_2$, among others, and form metallic silver with chromium oxide (trivalent chromium). This may show that no hexavalent chromium compound is included in ZPGM catalyst system without corrosion 118, therefore corrosion causing hexavalent chromium compounds may be decomposed by the reducing agent employed. Therefore, second manufacturing process 200 may allow the manufacturing of ZPGM catalyst system without corrosion 118, in which hexavalent chromium compounds corrosion causing may be converted into trivalent chromium compounds, which is not toxic.

While various aspects and embodiments have been disclosed, other aspects and embodiments may be contemplated. The various aspects and embodiments disclosed here are for purposes of illustration and are not intended to be limiting, with the true scope and spirit being indicated by the following claims.

What is claimed is:

1. A method for reducing corrosion of a catalytic system, comprising:
    providing a catalyst system, comprising:
        a substrate;
        a washcoat suitable for deposition on the substrate, comprising at least one first oxide solid selected from the group consisting of a first carrier material oxide, at least one first catalyst, and a mixture thereof; and
        an overcoat suitable for deposition on the substrate, comprising at least one second oxide solid selected from the group consisting of a second carrier material oxide, at least one second catalyst, and a mixture thereof;
        wherein at least one of the washcoat and the overcoat is aged; and
    providing an exhaust stream at a temperature of greater than 400° C. having one selected from the group consisting of hydrogen, carbon monoxide, ammonia and combinations thereof;
    wherein at least one hexavalent chromium compound is reduced.

2. The method according to claim 1, wherein aging is by heating to about 1100° C.

3. The method according to claim 2, wherein the heating may continue for about 3 hours to about 6 hours.

4. The method according to claim 2, wherein the heating occurs in the presence of one selected from the group consisting of hydrogen, carbon monoxide, ammonia, and combinations thereof.

5. The method according to claim 1, wherein aging is by heating to about 900° C.

6. The method according to claim 5, wherein the heating may continue for about 3 hours to about 6 hours.

7. The method according to claim 5, wherein the heating occurs in the presence of one selected from the group consisting of hydrogen, carbon monoxide, ammonia, and combinations thereof.

8. The method according to claim 1, wherein the washcoat is at least partially prepared by co-milling.

9. The method according to claim 1, wherein the washcoat is heated to about 550° C. for about 4 hours.

10. The method according to claim 1, wherein the overcoat is heated to about 550° C. for about 4 hours.

11. The method according to claim 1, wherein the substrate about 100 cells per square inch.

12. The method according to claim 1, wherein the substrate comprises metal.

13. The method according to claim 1, wherein at least one first catalyst is substantially free of platinum group metals.

14. The method according to claim 1, wherein at least one second catalyst is substantially free of platinum group metals.

15. The method according to claim 1, wherein at least one first catalyst comprises at least one selected from the group consisting of copper, cerium, silver, and combinations thereof.

16. The method according to claim 1, wherein at least one second catalyst comprises at least one selected from the group consisting of copper, cerium, silver, and combinations thereof.

17. The method according to claim 1, wherein the substrate comprises one selected from the group consisting of iron, chromium, and combinations thereof.

* * * * *